United States Patent
Dimitrovski et al.

(10) Patent No.: US 11,558,491 B2
(45) Date of Patent: Jan. 17, 2023

(54) INFORMATION-CENTRIC NETWORKING OVER 5G OR LATER NETWORKS

(71) Applicants: Koninklijke KPN N.V., Rotterdam (NL); NEDERLANDSE ORGANISATIE VOOR TOEGEPAST-NATUURWETENSCHAPPELIJK ONDERZOEK TNO, s-Gravenhage (NL)

(72) Inventors: Toni Dimitrovski, The Hague (NL); Pieter Nooren, Delft (NL); Lucia D'Acunto, Delft (NL); Bastiaan Wissingh, Leiden (NL)

(73) Assignees: KONINKLIJKE KPN N.V., Rotterdam (NL); NEDERLANDSE ORGANISATIE VOOR TOEGEPAST-NATUURWETENSCHAPPELIJK ONDERZOEK TNO, 's-Gravenhage (NL)

( * ) Notice: Subject to any disclaimer, the term of this patent is extended or adjusted under 35 U.S.C. 154(b) by 0 days.

(21) Appl. No.: 17/268,374

(22) PCT Filed: Aug. 23, 2019

(86) PCT No.: PCT/EP2019/072544
§ 371 (c)(1),
(2) Date: Feb. 12, 2021

(87) PCT Pub. No.: WO2020/039054
PCT Pub. Date: Feb. 27, 2020

(65) Prior Publication Data
US 2021/0194989 A1    Jun. 24, 2021

(30) Foreign Application Priority Data

Aug. 24, 2018 (EP) .................................. 18190629

(51) Int. Cl.
G06F 15/173 (2006.01)
H04L 67/63 (2022.01)
H04L 67/10 (2022.01)

(52) U.S. Cl.
CPC .............. *H04L 67/63* (2022.05); *H04L 67/10* (2013.01)

(58) Field of Classification Search
None
See application file for complete search history.

(56) References Cited

U.S. PATENT DOCUMENTS

2017/0041231 A1  2/2017  Seed et al.
2017/0332258 A1  11/2017  Rozhnova
(Continued)

FOREIGN PATENT DOCUMENTS

WO      2016170559 A1    10/2016
WO  WO 2017/202334 A1    11/2017
(Continued)

OTHER PUBLICATIONS

3GPP: 3rd Generation Partnership Project: System Architecture for the 5G System, 3GPP TS 23.501 version 15.2.0 Release 15, V15.2.0 (2018).
(Continued)

*Primary Examiner* — Quang N Nguyen
(74) *Attorney, Agent, or Firm* — Hamilton, Brook, Smith & Reynolds, P.C.

(57) ABSTRACT

In a communication network, a network function may be provided for controlling Information Centric Networking (ICN) protocol-based traffic flow between a set of user equipment (UE). This network function may be an ICN application function (ICN-AF), and may obtain information indicative of whether, and optionally to which degree, a respective ICN node is publisher of content in the exchange
(Continued)

of content between the ICN nodes. The ICN-AF may, for example via a session management function (SMF), initiate a reassignment of a PDU session of an ICN node which is presumed to be a requester of content to a data network access point which has connectivity to, or is the same as, a data network access point assigned to an ICN node which is characterized as publisher of content.

16 Claims, 10 Drawing Sheets

(56) References Cited

U.S. PATENT DOCUMENTS

| | | | |
|---|---|---|---|
| 2018/0192471 A1* | 7/2018 | Li | H04W 72/0493 |
| 2018/0376444 A1* | 12/2018 | Kim | H04W 4/70 |
| 2019/0261260 A1* | 8/2019 | Dao | H04W 48/18 |
| 2019/0281494 A1 | 9/2019 | Chan et al. | |
| 2019/0306758 A1* | 10/2019 | Ma | H04W 76/11 |
| 2020/0163145 A1* | 5/2020 | Park | H04W 76/18 |
| 2020/0187043 A1* | 6/2020 | Xin | H04W 48/16 |
| 2020/0228429 A1* | 7/2020 | Xin | H04L 43/087 |
| 2021/0160680 A1* | 5/2021 | Velev | H04W 8/005 |
| 2021/0168695 A1* | 6/2021 | Ryu | H04W 48/04 |
| 2021/0204357 A1* | 7/2021 | Tang | H04W 76/25 |
| 2021/0345166 A1 | 11/2021 | Dimitrovski et al. | |

FOREIGN PATENT DOCUMENTS

| | | | |
|---|---|---|---|
| WO | 2018137755 A1 | 8/2018 | |
| WO | WO-2018137755 A1 * | 8/2018 | H04W 36/26 |
| WO | 2018225039 A1 | 12/2018 | |
| WO | 2020039056 A1 | 2/2020 | |
| WO | WO 2021/091321 A1 | 5/2021 | |

OTHER PUBLICATIONS

3GPP: 3rd Generation Partnership Project: Procedures for the 5G System, 3GPP TS 23.502 version 15.2.0 Release 15, V15.2.0 (2018).

3GPP: 3rd Generation Partnership Project: Technical Specification Group Services and System Aspects "System Architecture for the 5G System, Stage 2", (Release 15), TS 22.261 (2017).

Ravindran, R., et al, "5G-ICN: Delivering ICN Services over 5G Using Network Slicing", IEEE Communications Magazine, May 2017.

Ravindran, R., et al., "Deploying ICN in 3GPP's 5G NextGen Core Architecture," IEEE 5G World Forum, pp. 26-32 (2018).

Ravindran, R., et al., "Enabling ICN in 3GPP's 5G NextGen Core Architecture," ICNRG, pp. 1-26 (2018).

CCN-lite implementation of the CCNx protocol, Retrieved from the Internet URL: http://ccn-lite.net (Aug. 28, 2018).

Nooren, P., et al., "Deploying ICN islands in a sea of IP—The role of interconnection and business models: Poster paper," 8th International Conference on the Network of the Future (NOF) (2017).

Named Data Networking Project, Retrieved from the Internet URL: http://named-data.net/ (Aug. 28, 2018).

PCT International Search Report for International Application No. PCT/EP2019/072544, entitled "Information-Centirc Networking Over 5G or Later Networks," filed Aug. 23, 2019.

* cited by examiner

INFORMATION-CENTRIC NETWORKING OVER 5G OR LATER NETWORKS

This application is the U.S. National Stage of International Application No. PCT/EP2019/072544, filed Aug. 23, 2019, which designates the U.S., published in English and claims priority under 35 U.S.C. § 119 or 365(c) to European Patent Application No. 18190629.8, filed Aug. 24, 2018. The entire teachings of the above applications are incorporated herein by reference.

FIELD OF THE INVENTION

The invention relates to a communication network having data planes and network functions, and to user equipment (pl.) which may be connected to the communication network and which may represent Information-Centric Networking (ICN) nodes of an ICN network. The communication network may, during operational use, transport ICN protocol-based traffic of the ICN nodes.

The invention further relates to entities associated with the communication network, such as a network node or a distributed system of network nodes, to a method for use with the communication network, and to a computer program comprising instructions for causing a processor system to perform the method.

BACKGROUND ART

Information-Centric Networking (ICN)

Information-Centric Networking (ICN) refers to a class of network architectures for the transport and distribution of content. Specific examples of ICN architectures include, but are not limited, to those implemented by [1] and [2]. The concept behind ICN architectures is to replace the host-centric endpoints paradigm of current Internet Protocol (IP)-based architectures by a named information paradigm, by which every network node in the ICN network can request a particular piece of content (with this network node henceforth also being referred to as a 'requester' of content) and receive it from any other network node that has the content (with this network node henceforth also being referred to as a 'publisher' of the content). A requester may consume the content it requests itself or alternatively may request the content on behalf of another node. There may thus be a chain of nodes between the publisher and the consumer of content. In such ICN-based network architectures, content consumer mobility is typically native and does not need specific handling.

From a historical perspective, the road to any 'Future Internet' with ICN at its core is likely to involve gradually replacing the incumbent network architecture. Such gradually replacing may involve concepts such those described in [3], in which a so-called 'sea of IP' has to interconnect the initially small 'islands' of ICN networks.

Next Generation (5G) Communication Networks

The interconnections between the islands of ICN networks are likely to use next generation communication networks, such as 3GPP's 5G [5]. These communication networks may separate network functions from the underlying hardware resources, being the network nodes of the communication network. For that purpose, so-called Network Virtualization (NV) techniques may be used, and in particular Network Function Virtualization (NFV) techniques which provide network functions that are instantiable in software using the hardware of one or more of the network nodes. In the following, 'providing' or 'establishing' a network function may thus refer to the instantiation of the network function in the communication network.

The next generation communication networks may further provide virtual data planes which separate data traffic in the network. Such virtual data planes, which may be established by Software-Defined Network (SDN) but also by other techniques, may include a control plane to enable transmission of control data in the network, and a user plane to enable transmission of user data to and/or from User Equipment (UE) connected to the network. The user plane may also be referred to as 'data plane'.

Moreover, a set of virtualized network functions may be provided which may be instantiable using one or more of the plurality of network nodes and which comprise user plane functions operating in the user plane and control plane functions operating in the control plane. For example, such control plane functions may include a Session Management Function (SMF) configured for session management of protocol data unit (PDU) sessions involving user equipment connected to the communication network.

It is noted that although the above refers to virtualization of data planes and network functions, it is also known to establish the data planes and the network functions as described in this specification without virtualization techniques.

The main advantages of these communication networks in regard to content distribution may be their wide wireless coverage and their handling of mobility.

Furthermore, it is envisioned that these communication networks will for the first time achieve 'true' fixed-mobile convergence-one 'core' communication network as an umbrella to many access networks. This provides the potential to have a single entry point to the Internet for a subscriber regardless of access type usage.

ICN Via Next Generation Communication Networks

3GPP [5] currently does not provide native support for ICN protocols, nor is such support envisioned. As such, it is envisioned that ICN protocol-based traffic will be overlaid over next-generation communication networks (also referred to as 'ICN-as-an-overlay') and control over the ICN protocol-based traffic may have to be exercised outside of the communication network's domain. This, however, may likely lead to inefficiencies in traffic routing (e.g., tromboning, double tunneling) which in turn may result in poor service delivery. A reason for this is that control decisions made in the ICN and '5G' domains may be contradictory and thereby counterproductive.

Although the above problem is described for a 3GPP 5G communication network, a similar problem is expected to occur with other communication networks which do not provide native support for ICN protocols. Accordingly, any technical measures described with the context of a 3GPP or 5G communication network are to be understood to apply to such other networks as well, mutatis mutandis.

REFERENCES

[1] Named Data Networking Project, http://named-data.net/

[2] CCN-lite implementation of the CCNx protocol, http://ccn-lite.net

[3] Pieter Nooren, Niels van Adrichem, Lucia D'Acunto, *"Deploying ICN islands in a sea of IP—The role of interconnection and business models: Poster paper"*, 2017 8th International Conference on the Network of the Future (NOF)

[4] Ravishankar Ravindran, Asit Chakraborti, Syed Obaid Amin, Aytac Azgin, and Guoqiang Wang, *"5GG-ICN: Delivering ICN Services over 5G Using Network Slicing"*, IEEE Communications Magazine, May 2017

[5] 3rd Generation Partnership Project, Technical Specification Group Services and System Aspects, *"System Architecture for the 5G System, Stage 2 (Release 15)"*, TS 22.261, 2017-09, section 6.10.2.

SUMMARY OF THE INVENTION

It would be desirable for a communication network which may have no native support for ICN protocols to better support ICN protocol-based traffic between user equipment acting as ICN nodes, and thereby to facilitate the adoption of ICN.

To this end, a new network function may be provided in the communication network, namely an ICN application function (ICN-AF) configured to control ICN protocol-based traffic flow between a set of user equipment (UE). Specifically, the ICN-AF may obtain information indicative of whether, and optionally to which degree, a respective ICN node is publisher of content in the exchange of content between the ICN nodes, and may, for example via a session management function (SMF), initiate the reassignment of a protocol data unit (PDU) session of an ICN node which is not characterized as publisher of content to a data network access point which has connectivity to, or which is the same as, a data network access point assigned to an ICN node which is characterized as publisher.

In accordance with a first aspect of the invention, a network node or a distributed system of network nodes may be configured as an information-centric networking application function for use in a communication network. The communication network may comprise a plurality of network nodes and may be configured to provide:

a control plane to enable transmission of control data in the communication network;
a user plane to enable transmission of data to or from user equipment which is connected to the communication network; and
a set of network functions which comprise control plane functions operating in the control plane, wherein the control plane functions include the information-centric networking application function (ICN-AF) for controlling ICN protocol-based traffic flow between a set of user equipment (UE),
wherein each user equipment (UE) of the set of user equipment represents an ICN node in an ICN network and is configured for exchange of content via ICN protocol-based traffic, wherein the ICN protocol-based traffic is at least in part transported via protocol data unit (PDU) sessions in the communication network,
wherein the network node or the distributed system of network nodes may comprise:
a network interface to the communication network;
a processor system which may be configured to:
for at least one of the ICN nodes, obtain information indicative of whether, and optionally to which degree, a respective ICN node is publisher of content in the exchange of content between the ICN nodes;
initiate a reassignment of a protocol data unit (PDU) session of an ICN node which is not characterized as publisher of content to a data network access point which has connectivity to, or which is the same as, a data network access point assigned to an ICN node which is characterized as publisher of content.

In accordance with a further aspect of the invention, an information-centric networking application function (ICN-AF) may be provided for use with a communication network. The communication network may comprise a plurality of network nodes and may be configured to provide:

a control plane to enable transmission of control data in the communication network;
a user plane to enable transmission of data to or from user equipment which is connected to the communication network; and
a set of network functions which comprise control plane functions operating in the control plane, wherein the control plane functions include the information-centric networking application function (ICN-AF) for controlling ICN protocol-based traffic flow between a set of user equipment (UE),
wherein each user equipment (UE) of the set of user equipment represents an ICN node in an ICN network and is configured for exchange of content via ICN protocol-based traffic, wherein the ICN protocol-based traffic is at least in part transported via protocol data unit (PDU) sessions in the communication network;
The ICN application function (ICN-AF) may be configured to:
for at least one of the ICN nodes, obtain information indicative of whether, and optionally to which degree, a respective ICN node is publisher of content in the exchange of content between the ICN nodes;
initiate a reassignment of a protocol data unit (PDU) session of an ICN node which is not characterized as publisher of content to a data network access point which has connectivity to, or which is the same as, a data network access point assigned to an ICN node which is characterized as publisher of content.

In accordance with a further aspect of the invention, a communication network may comprise a plurality of network nodes and may be configured to provide:

a control plane to enable transmission of control data in the communication network;
a user plane to enable transmission of data to or from user equipment which is connected to the communication network; and
a set of network functions which comprise control plane functions operating in the control plane, wherein the control plane functions include an information-centric networking application function (ICN-AF) for controlling ICN protocol-based traffic flow between a set of user equipment (UE),
wherein each user equipment (UE) of the set of user equipment may represent an ICN node in an ICN network and may be configured for exchange of content via ICN protocol-based traffic, wherein the ICN protocol-based traffic may be at least in part transported via protocol data unit (PDU) sessions in the communication network;

wherein the ICN application function (ICN-AF) may be configured to:
for at least one of the ICN nodes, obtain information indicative of whether, and optionally to which degree, a respective ICN node is publisher of content in the exchange of content between the ICN nodes;
initiate a reassignment of a protocol data unit (PDU) session of an ICN node which is not characterized as publisher of content to a data network access point which has connectivity to, or which is the same as, a data network access point assigned to an ICN node which is characterized as publisher of content.

In accordance with a further aspect of the invention, a device or network node may be configured as user equipment (UE). The user equipment may represent an information-centric networking (ICN) node in an ICN network. The user equipment may be configured for exchange of content via ICN protocol-based traffic. The ICN protocol-based traffic may be at least in part transported via protocol data unit (PDU) sessions in a communication network. The device or network node may comprise:
a network interface to the communication network;
a processor system configured to:
via the network interface, provide information to an information-centric networking application function (ICN-AF), the information being indicative of whether, and optionally to which degree, the user equipment as the ICN node is publisher of content in the exchange of content between ICN nodes.

In accordance with a further aspect of the invention, a method may be provided for use with a communication network which may comprise a plurality of network nodes and which may be configured to provide:
a control plane to enable transmission of control data in the communication network;
a user plane to enable transmission of data to or from user equipment which is connected to the communication network; and
a set of network functions which comprise control plane functions operating in the control plane;
the method may comprise:
controlling ICN protocol-based traffic flow between a set of user equipment (UE), wherein each user equipment (UE) of the set of user equipment may represent an ICN node in an ICN network and may be configured for exchange of content via ICN protocol-based traffic, wherein the ICN protocol-based traffic may be at least in part transported via protocol data unit (PDU) sessions in the communication network;
wherein the controlling of ICN protocol-based traffic flow may comprise:
for at least one of the ICN nodes, obtaining information indicative of whether, and optionally to which degree, a respective ICN node is publisher of content in the exchange of content between the ICN nodes;
initiating reassigning a protocol data unit (PDU) session of an ICN node which is not characterized as publisher of content to a data network access point which has connectivity to, or which is the same as, a data network access point assigned to an ICN node which is characterized as publisher of content In accordance with a further aspect of the invention, transitory or non-transitory computer-readable medium may comprise a computer program which may comprise instructions for causing a processor system to perform the method.

The above measures may be based on the consideration that if an ICN node has a relatively large amount of published content (henceforth also simply referred to as 'publisher'), its PDU session is preferably kept static in the ICN layer as opposed to an ICN node that has less or no published content. Here, 'having content' includes the ICN node itself having the content, but also an ICN network behind the ICN node having the content. The PDU sessions of ICN nodes having less or no published content, but which instead request content for themselves (henceforth also simply referred to as 'requester' or 'consumer') or on behalf of an ICN network behind the ICN node ('requester'), may be more dynamic as their session mobility is natively handled by the ICN layer. Conversely, the session mobility of publishers is not efficiently handled by the ICN layer. As such, it may be preferred to keep their PDU sessions static or at least to limit their movement in the communication network, but if needed, rather move PDU sessions of requesters in the communication network.

For that purpose, an ICN application function (ICN-AF) may be provided. In general, application functions may be provided in communication networks to 'tailor' the communication network to the requirements of applications which use the network. For example, 3GPP [5] describes an architecture for a next generation mobile network which includes application functions. This architecture is shown in FIG. 1, where the AF is shown to be instantiated as a control plane function operating in the Control Plane (CP) of the network. However, the AF in this architecture may be seen as merely representing a function placeholder for different applications and having only broadly defined procedures for how applications can influence the network traffic.

The ICN-AF may be specifically configured to control ICN protocol-based traffic flow between ICN nodes. As such, the ICN may have standard, e.g., 3GPP, functionality of an AF network function as well as ICN-specific functionality. Specifically, the ICN-AF may obtain information from ICN nodes which is indicative of whether, and optionally to which degree, a respective ICN node is publisher of content in the exchange of content between the ICN nodes. Such information may also, at least indirectly, be indicative of whether, and optionally to which degree, a respective ICN node is a requester of content. For example, if the information obtained from a particular ICN node indicates that this particular ICN node has little or no published content, the ICN-AF may consider this particular ICN node as 'not a publisher' and thereby presume it to be a requester in the exchange of content between ICN nodes.

By being located at least in part in the control plane of the communication network, the ICN-AF may control the mobility of PDU sessions of ICN nodes based on the obtained information. Specifically, the ICN-AF may 'move' PDU sessions of ICN nodes which are not characterized as publisher of content towards ICN nodes which are characterized as publisher of content. Here, 'characterized as' may refer to an explicit or implicit characterization by the ICN-AF, e.g., according to criteria such as, but not limited to the number of published content items, the size of the published content items, etc. It is noted that the ICN-AF characterizing a particular ICN node as 'not a publisher' may specifically refer to characterization of the ICN node by the ICN-AF, but which does not exclude that the ICN node in fact does publish content (it may, but not to a degree according to which the ICN-AF internally considers the ICN node to be a publisher) nor does it imply that the ICN node is actually requester of content (it may or may not, but statistically, non-publishers may likely be requesters).

With due consideration of the above, for sake of linguistic brevity, the ICN nodes identified as 'not a publisher' may in the following also simply be referred to as 'presumed requesters' due to a presumption of said ICN nodes being requesters.

The term 'move' may refer to the initiating of a reassignment of the PDU session of a requester to another data network access point, while 'move towards' may specifically refer to the initiating of an assignment of a data network access point which has connectivity to, or is the same as, the data network access point of an ICN node which is characterized as publisher. Such reassignment may, for example, be initiated by the ICN-AF by requesting a session management function (SMF) to effect said reassignment. Furthermore, the term 'has connectivity to' refers to data connectivity, e.g., allowing data to be exchanged, and may include direct connections between data network access points, e.g., via a node-to-node transport link, but also indirect connections, e.g., via one or more switches. The moving of a PDU session of an ICN node by initiating the reassigning of a data network access point to the ICN node may in the following also be simply referred to as 'moving a PDU session of an ICN node' or 'moving the ICN node'.

By moving the PDU sessions of 'presumed requesters' instead of those of publishers in the claimed manner, the ICN-AF may account for session mobility of publishers being poorly handled in the overlaying ICN network, while still facilitating ICN traffic flow between the presumed requesters and the publishers as both are assigned the same or directly or indirectly connected data network access points.

An advantage of the use of the ICN-AF may be that the communication network better supports ICN protocol-based traffic between user equipment acting as ICN nodes. Compared to the approach chosen by [4], the same 'flat model' as described in FIG. 2 of that article may be established, but with less impact to the (5G) network architecture, e.g., without requiring changes to the Serving Gateway (S-GW) or the PDN Gateway (P-GW). In view of the expected gradual introduction of ICN, this may represent a more feasible approach for migration to an ICN 'Future Internet'.

In an embodiment, the control plane functions may further comprise a session management function (SMF) for session management of the protocol data unit (PDU) sessions involving the user equipment, and the ICN application function (ICN-AF) may configured to initiate the reassignment of the PDU session by requesting the session management function (SMF) to effect the reassignment. For example, the ICN-AF may send a request to the SMF to reassign the PDU session in a manner as described elsewhere in this specification. It will be appreciated that instead of using the SMF, also other mechanisms for effecting the reassignment may be used and are within reach of the skilled person on the basis of the present specification.

In an embodiment, when there are multiple data network access points that have connectivity to the data network access point of the ICN node characterized as publisher, the ICN-AF may (re)assign the PDU session of the presumed requester to the data network access point which is nearest in terms of a distance in the network topology to the data network access point of the ICN node characterized as publisher. For example, the data network access point may be selected which has the smallest number of hops from the publisher's data network access point, or has the smallest network delay thereto, etc. Various other distance metrics exist and may be used.

In an embodiment, the ICN application function may receive second information which may identify content items which are published by a respective ICN node, or the network behind it, for example by the information providing the names or name prefixes of published content items. The second information may be the same type of information which is indicative of whether, and optionally to which degree, a respective ICN node is publisher of content in the exchange of content between the ICN nodes (the latter information also being referred to as 'first' information). For example, from the names or name prefixes, it may be determined whether an ICN node is to be characterized as publisher, and if so, which content items are published.

In a same or further embodiment, the ICN application function may receive third information which may identify content items which may be requested by a respective ICN node, or the network behind it. Such third information may be received in a same or similar manner as described for the first or second information. Using all three types of information, the ICN application function may initiate the reassignment of the protocol data unit (PDU) session of an ICN node which is based on the third information characterized as requester of a content item to a data network access point which has connectivity to, or which is the same as, a data network access point assigned to an ICN node which is based on the second information characterized as publisher of the content item. Accordingly, the ICN application function may specifically move a requester which requests certain content, say content 'A', in a content-dependent manner, e.g., towards a publisher of content 'A'. It is noted that such content-dependent 'moving' is not a requirement, as simply moving requesters to establish connectivity with publishers may on average establish improved connectivity between publishers and requesters, even if in some cases it is not needed for a particular requester to be in connectivity with a particular publisher.

In an embodiment, the ICN application function may be configured to, in the establishment of a protocol data unit session for an ICN node which is not characterized as publisher of content, initiate an assignment of said protocol data unit session to a data network access point which has connectivity to, or which is the same as, a data network access point assigned to an ICN node which is characterized as publisher of content. Additionally or alternatively to moving an existing PDU session of a presumed requester, the ICN-AF may also control or influence the new establishment of the PDU session of a presumed requester in a similar manner, namely by, in the establishment of the PDU session, initiating the assigning of a data network access point which has connectivity to, or which is the same as, a data network access point assigned to a publisher. It is noted that this functionality may be implemented by the ICN-AF separately from the functionality of reassigning data network access points of existing PDU sessions.

In an embodiment, the ICN application function may be configured to limit or avoid initiating the reassignment of a data network access point for an ICN node which is characterized as publisher of content. Here, the term 'limit' may be defined relative to the movement of PDU sessions of ICN nodes which are not characterized as publisher of content. For example, 'limit' may refer to the PDU sessions of publishers being, on average, moved less frequently than PDU sessions of presumed requesters. As such, the ICN-AF may avoid or limit initiating the moving of the PDU sessions of publishers but, if possible, rather initiate the move of the PDU sessions of presumed requesters.

In an embodiment, said (re)assignment may comprise providing a data network access identifier identifying a (re)assigned data network access point to a respective ICN node. Such data network access identifiers (DNAI) are well-suited for allowing the data network access point to be identified and (re)assigned.

In an embodiment, the information obtained by the ICN application function may be indicative of at least one of: a number of content objects, and a data size of all or individual ones of the content objects, which are published by the respective ICN node. Various information may be indicative of whether a respective ICN node is a publisher and to which degree, such as, but not limited to, a number of content objects (also referred to as content items) and/or their size, individually and/or combined.

In an embodiment, the ICN application function may be configured to receive the information pertaining to a respective ICN node from the respective ICN node. For example, the ICN application function may receive the information pertaining to a respective ICN node from the respective ICN node via a non-access stratum (NAS) transport mechanism, or via a protocol data unit (PDU) session of the respective ICN node. An ICN node may itself provide various types of (statistical) information to the ICN-AF which may allow the ICN-AF to characterize the particular ICN node. For that purpose, a data communication channel may be established between the ICN-AF and the ICN node, such as one of those indicated above, while the ICN node may be configured to report such information using via data communication channel. By directly obtaining the information from the ICN node, it may not be needed for the ICN-AF to infer whether an ICN node is publisher or not from other types of information.

In an embodiment, the control plane functions may further comprise a network exposure function, and the ICN application function may be configured to communicate with the session management function and/or other control plane functions via the network exposure function.

In an embodiment, the control plane functions may further comprise a policy control function for policy control of quality of service in the communication network, the session management function may be configured to perform the session management based on policy data provided by the policy control function, and the ICN application function may be configured to control the session management of protocol data unit sessions via the policy control function.

In an embodiment, the communication network may be a telecommunication network. In an embodiment, the communication network may comprise a core network, e.g., of a connectivity provider's network. The connectivity provider's network may be a network adhering to one or more 3GPP standards.

Any function names such as SMF, PCF, NEF and ICN-AF are descriptive names but do not imply limitations other than those claimed and/or described.

It will be appreciated by those skilled in the art that two or more of the above-mentioned embodiments, implementations, and/or aspects of the invention may be combined in any way deemed useful.

Modifications and variations of any one of the processor systems, network nodes, the method and/or the computer programs, which correspond to the described modifications and variations of the communication network, and vice versa, may be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

Figure 1:
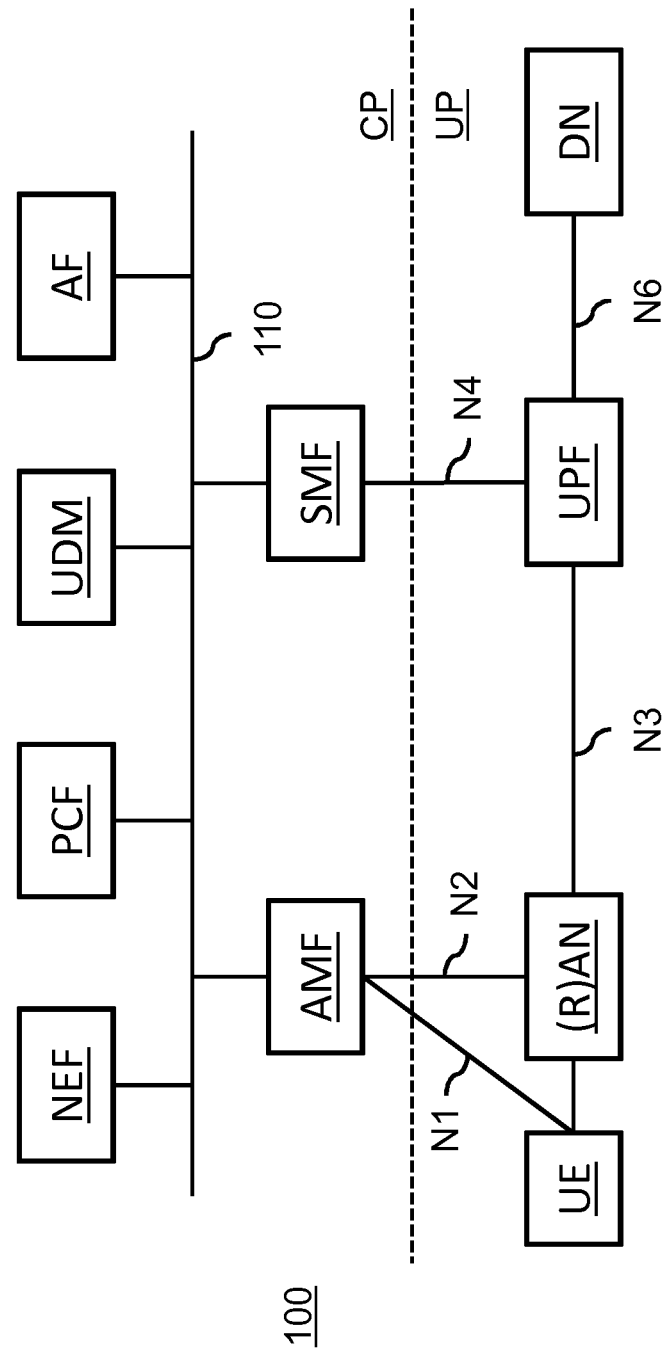
FIG. 1 shows a prior art 3GPP telecommunication network which comprises a control plane (CP) and a user plane (UP) and various 3GPP network functions.

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

N1-N6 interfaces
AF application function
AMF access and mobility management function
CP control plane
DN data network
DNN data network name
DNAI data network access identifier
ICN information centric networking
ICN-AF ICN application function
NEF network exposure function
PCF policy control function
PDU protocol data unit
(R)AN (radio) access network
SMF session management function
UDM unified data management
UE user equipment
UP user plane
UPF user plane function 100 connectivity provider's network
110 service bus
120-124 ICN island
130-134 switching function
140-144 interfaces to ICN-AF
200 system representing network node or user equipment
210 network interface
220 processor
230 storage
300 computer readable medium
310 non-transitory data
1000 exemplary data processing system
1002 processor
1004 memory element
1006 system bus
1008 local memory
1010 bulk storage device
1012 input device
1014 output device
1016 network adapter
1018 application

DETAILED DESCRIPTION OF EMBODIMENTS

The following embodiments are described in the context of a telecommunication network adhering to one or more 5G 3GPP standards, such as [5] which is hereby incorporated by reference at least in as far as pertaining to its architecture and network functions. In these embodiments, network functions as claimed other than the ICN application function (ICN-AF) may be further explained in accordance with the following glossary. This glossary, however, is not meant to limit the interpretation of the claims. Namely, the concepts described in the following embodiments may equally apply, mutatis mutandis, to any other type of communication network having separate user and control planes and network functions capable of performing the functions as defined by the wording of the claims.

Glossary of Terms

AMF—Access and Mobility Management Function: may provide UE-based authentication, authorization, and mobility management. The AMF may be the first element that a UE connects to when it wishes to use a 5G network.

DN—Data Network: may represent a network outside of the 5G network. This may still be inside the operator's network, or may be outside, facing the Internet.

NEF—Network Exposure Function: may expose the network functions and capabilities of the 5G network to 3rd parties, e.g., not affiliated with the operator.

PCF—Policy Control Function: may be responsible for policy control in order to enable Quality of Service (QoS) management.

PDU—Protocol Data Unit: this term may refer to a packet or frame exchanged between a UE and an entity in the Data Network.

PDU Session: an association between the UE and a Data Network (DN) that provides a PDU connectivity service. The type of association may be IP, Ethernet or Unstructured. Via a PDU session the UE may exchange data with the particular DN.

(R)AN—(Radio) Access Network: part of the network that connects the UE with the core 5G network (e.g., AMF, PCF, NEF, SMF, UPF may be in the core).

SMF—Session Management Function: may be responsible for session management and may allocate addresses to UEs; may also select and control the UPFs for data transfer; the SMF may be seen as an SDN network controller.

UE—User Equipment: may represent an end-user device (e.g. mobile phone, tablet, smart watch, VR headset, TV, set-top box, laptop, etc.).

UPF—User Plane Function: may route the PDU sessions of UEs across the 5G network; it may be seen as a network router or switch or forwarder.

Prior Art Network

FIG. 1 shows the general architecture of a communication network 100 as described by [5] which may represent a connectivity provider's network, and in which an application function (AF) is provided as a control plane function operating in the control plane CP of the network. It can be seen that the AF is connected to a service bus 110 in the control plane CP. FIG. 1 further illustrates the user plane UP, and interfaces N1, N2 and N4 which may be used by the control plane to setup data-paths in the user plane. In addition, a N6 interface is shown to an (external) data network DN.

Schematic Overview

Figure 2:
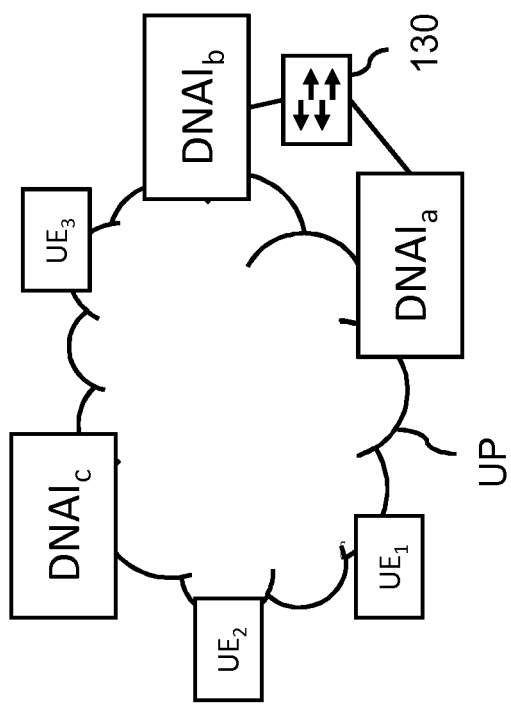
FIG. 2 shows a schematic and conceptual overview of a communication network having three ICN-UEs and three DNAIs from the perspective of the ICN-AF.

FIG. 2 provides a schematic and conceptual overview of the communication network from the perspective of an ICN application function (ICN-AF). This ICN-AF may be a newly provided network function which may control and influence ICN protocol-based traffic in the communication network. In this example, three UEs (UE1-UE3) are shown to be connected to the user plane (UP) of the network, while three data network access points (DNAIa-DNAIc) are provided. Here, the term 'DNAI' refers to Data Network Access Identifier, but with the term being used here and elsewhere as a representation of the data network access point which is identified by the respective DNAI. In general, a data network access point may represent an exit link to a specific Data Network Name (DNN), e.g., as defined in accordance with 3GPP TS 23.501.

The UEs may act as ICN nodes within an ICN network (not explicitly shown in FIG. 2) and may exchange content via ICN protocol-based traffic. Such UEs are also referred to as ICN-UE's or simply as ICN nodes. Generally, the ICN-UEs may use ICN protocols to exchange content over Ethernet, IP or Unstructured PDU sessions.

FIG. 2 shows an embodiment in which Ethernet PDU sessions are used and in which PDU sessions may be switched via internal switches of the network, e.g., via one or more User Plane Functions (UPF) hosting a DNAI. However, such switching may also involve external switches, e.g., the switch 130 between DNAIa and DNAIb.

The newly provided ICN-AF may control the ICN protocol-based traffic flow between the ICN-UE's. The ICN-AF itself is not shown in FIG. 2. In general, however, the ICN-AF may reorganize the ICN layer network connectivity based on a role of a respective ICN-UE, being a publisher of content or not (possibly quantified to reflect a degree by which an ICN-UE is publisher). The characterization of publisher or not (the latter being presumed to be a requester) may be based on information received by the ICN-AF from ICN-UEs, as will also be further explained with reference to FIGS. 4 and 5.

In general, the ICN-AF's functionality may be based on the recognition that if a particular ICN-UE has a significant amount of published content, its PDU session is preferably kept static, or may be limited in movement in the ICN layer compared to an ICN-UE that has no published content. The PDU sessions of the latter type of UEs may be more dynamic as their session mobility may be natively handled by the ICN layer. In recognition of the above, the ICN-AF may control the ICN protocol-based traffic flow to move the PDU sessions of presumed requesters towards publishers, rather than the other way around. As will also explained with reference to FIGS. 6-7B, the moving of a PDU session of a particular UE may involve reassigning a DNAI to the UE, but may also be simply referred to as 'moving the PDU session of the UE' or 'moving the UE'.

The ICN-AF may thus evaluate the PDU sessions between ICN-UEs and DNAIs and, depending on each of the ICN-UE's published content, initiate changes in the network to influence the ICN protocol-based traffic flow. This functionality may also be referred to as the 'orchestration' of the ICN traffic, and may be performed by the ICN-AF, which itself may have standard 3GPP functionality of the AF network function as well as ICN specific functionality implementing the described functionality.

ICN-UE and ICN Islands

Figure 3:
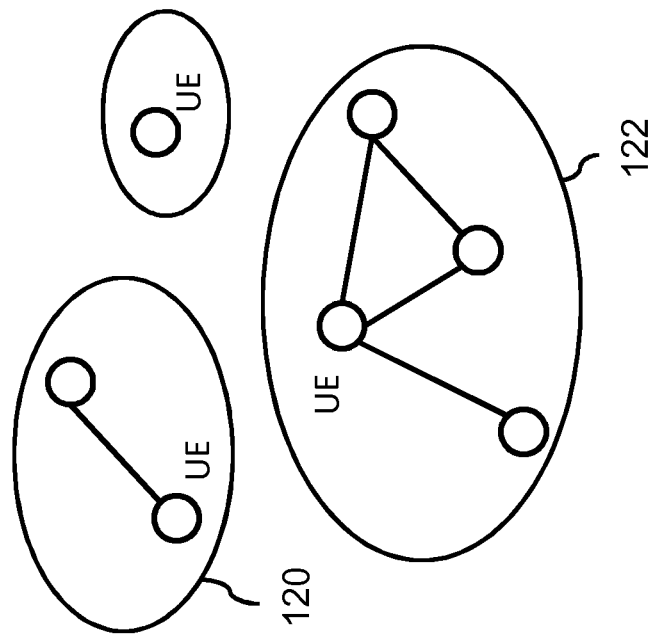
FIG. 3 illustrates two ICN-UEs which each connect an ICN network ('ICN island') to the communication network, as well as an individual ICN-UE.

FIG. 3 illustrates the following. An ICN-UE may publish or request content solely by itself. However, an ICN-UE may also connect an 'island' 120, 122 of other ICN nodes to the communication network, in which case it may publish or request content on behalf of other ICN nodes in the island 120, 122. Accordingly, when characterizing an ICN-UE as publisher or not, and optionally to a degree of being a publisher, this may effectively also, or primarily, characterize the ICN island connected by the respective ICN-UE to the communication network.

In this respect, it is noted that an ICN-UE may represent both a publisher and a requester of content, both by its own or by way of the ICN-UE connecting an ICN island to the network. For example, in case of the ICN-UE connecting an ICN island to the communication network, a portion of the ICN nodes within the ICN island may be publishers and another portion of the ICN node may be requesters. A reference to an ICN-UE being a 'publisher' thus does not exclude the ICN-UE also being a 'requester'. Nevertheless, as also explained further onwards, the ICN-AF may primarily or only obtain information which is indicative of whether, and optionally to which degree, an ICN-UE is a publisher, and characterize the ICN-UE as a 'requester' only by the ICN-UE being, on the basis of the obtained information, not considered a publisher.

Data Communication from ICN-UE to ICN-AF

There may be different ways for the ICN-AF to receive information indicative of whether, and optionally to which degree, a respective ICN node is publisher of content in the exchange of content between the ICN nodes. For example, in case of a 5G communication network, the NAS transport mechanism as defined in 3GPP TS 23.501 may be used for an ICN node to communicate with the ICN-AF.

Figure 4:
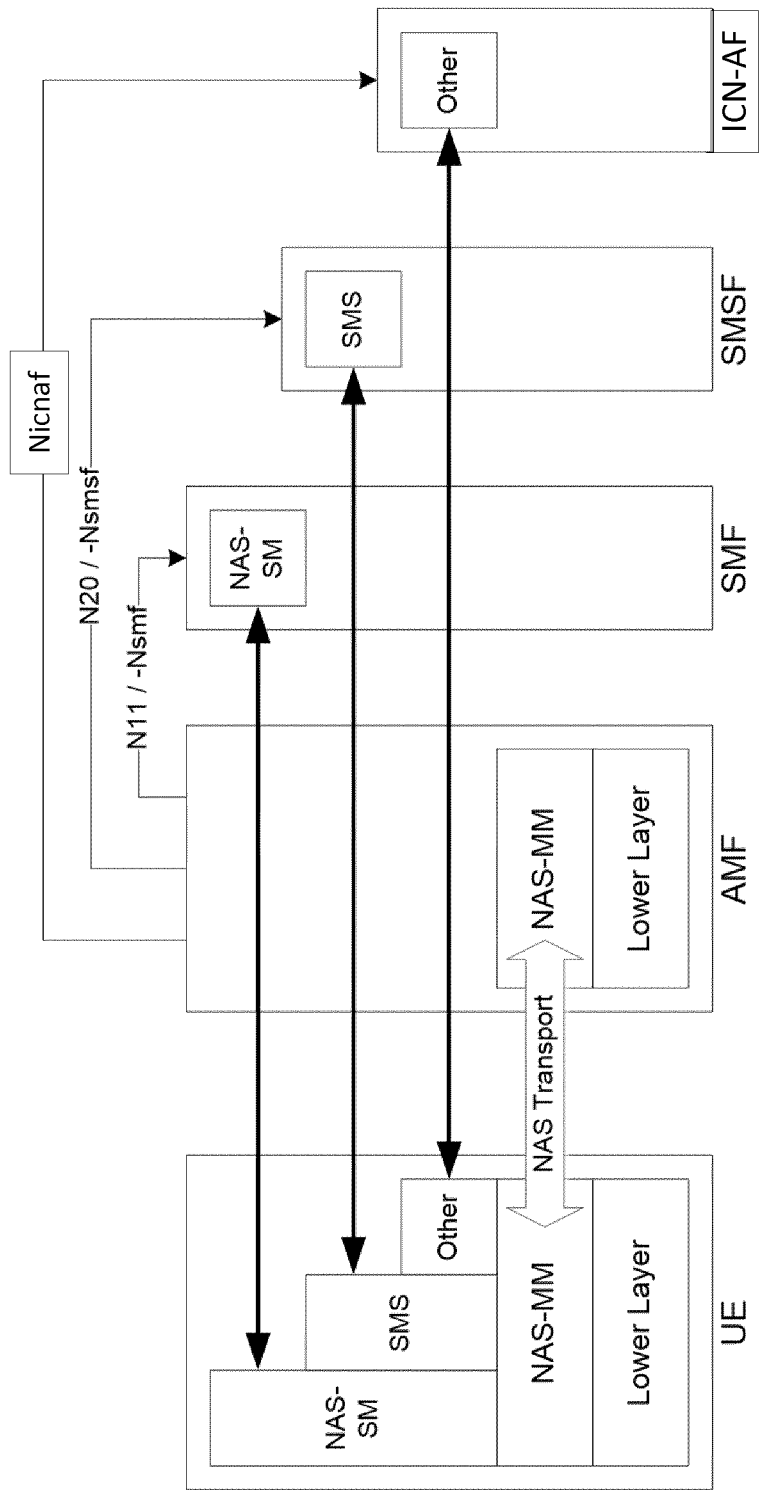
FIG. 4 illustrates data communication between the ICN-AF and ICN-UEs via the NAS transport mechanism.

FIG. 4 illustrates such data communication between the ICN-AF and ICN-UEs via the NAS transport mechanism. The messages exchanged between the UE and the ICN-AF may be part of an ICN-5G control protocol and used to provide information to the ICN-AF about published content. When using the NAS transport mechanism, this information may be sent using aggregation, e.g., advertising only name prefixes instead of full names, as there usually is a constraint on the PDU size in NAS transport. In case of a tighter technical relationship between the ICN and the 5G operators, the use of the NAS transport mechanism may be preferred over other alternatives as the control plane may be tightly coupled and the development possibilities may be larger: the ICN-AF may have access to the control plane of the network and may use all the authorized services from each network function. This may avoid or reduce the need for security related boundaries between systems, allow more cross-system functionality and generally improve efficiency in content delivery.

Figure 5:
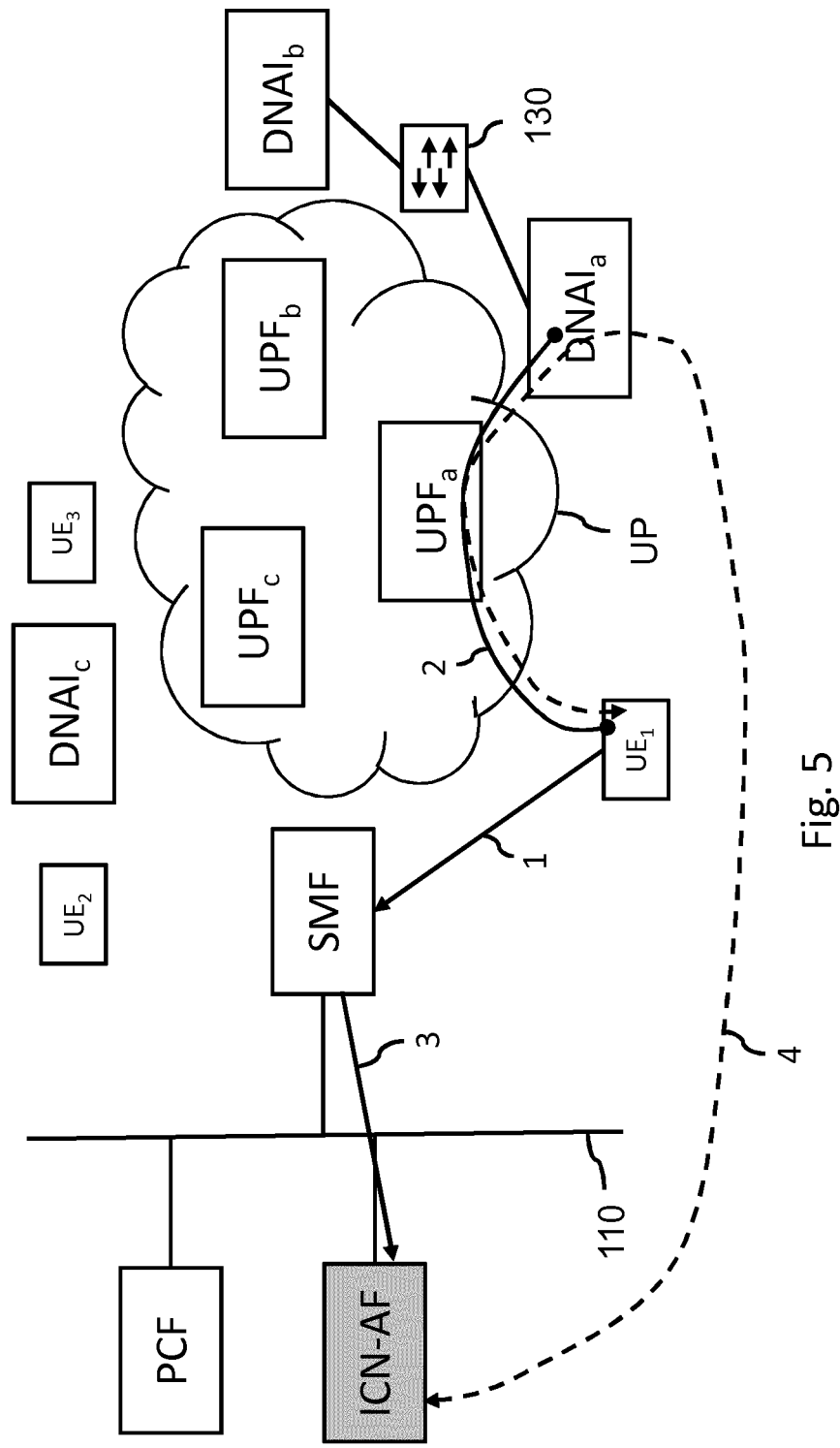
FIG. 5 illustrates a message exchange between the ICN-AF and ICN-UEs which takes place via the user plane of the communication network.

FIG. 5 shows an alternative to FIG. 4, namely one where a message exchange between the ICN-AF and ICN-UEs takes place via the user plane of the communication network. This and later figures essentially combine FIGS. 1 and 2 to illustrate the message exchange while omitting parts of the communication network for sake of legibility. In this example, a PDU session which is established for ICN traffic may be used by the ICN-UE to provide information to the ICN-AF about published content. For that purpose, the ICN-AF may be in part located in the ICN-UE's user plane (not shown explicitly in FIG. 5) since the ICN-AF may need to exchange messages with the ICN-UE before the ICN-UE joins the ICN network. The ICN-AF may therefore need to be reachable from every DNAI to which a particular ICN-UE may establish a PDU session to. Compared to the FIG. 4 alternative, this type of embodiment does not rely on a tight technical relation between the ICN and the 5G operators. Accordingly, the ICN-AF may not have access to the 5G network control plane but may send requests via the Network Exposure Function (NEF).

The message exchange may be as follows (the numbering matching FIG. 5):

1. UE1 may send a PDU Session Establishment Request to the SMF.

2. The PDU session to the UE may be established, for example according to the procedure specified in TS 23.502, clause 4.3.2.2.1, either to a default DNAI or a DNAI chosen based on the UE's location. In this example it is DNAIa.

3. The ICN-AF may be notified by the SMF that a PDU session is created for UE1, for example with the service operation Nsmf_EventExposure_Notify (UE1 ID, PDU Session ID, DNAIa) specified in TS 23.502 clause 5.2.8.3.2.

4. Communication may take place between UE1 and the ICN-AF via the PDU session which is created for UE1.

Information Provided by ICN-UE

The information obtained by the ICN-AF may be indicative of whether, and optionally to which degree, a respective ICN-UE is a publisher of content. This information may also be referred to as 'published content information' and may take various forms. For example, the information may be indicative of a quantity of the published content, for example the number of published content items (also referred to as 'content objects'). Such information may be reported directly by an ICN-UE, e.g., as a numeric value, but also indirectly, e.g., by reporting the names or name prefixes of published content items to the ICN-AF. Another example is that an ICN-UE may report the size of the published content, either instead or in addition to the number of published content items. For example, the total size of the published content items may be reported, or the size per published content item. In general, the size may be relevant as larger content items may take longer to transfer and thus are more at risk of being disrupted due to movement of a publisher. It may thus be preferable to limit the movement of publishers which have large(r) content items, for example, relative to the movement of publishers which have a same number but smaller content items.

It is further noted that the published content information may be directly indicative of a respective ICN-UE being a publisher of content, but in some embodiments only indirectly indicative of a respective ICN-UE being requester. Namely, if the information indicates that a respective ICN-UE is not a publisher, or only to a relatively low degree, or if such information is not received at all, the ICN-AF may presume the ICN-UE to be a requester. Accordingly, the information obtained from the ICN-UE may be only indirectly indicative of whether the ICN-UE is a requester.

Control of ICN Protocol-Based Traffic Flow by ICN-AF

Figure 6:
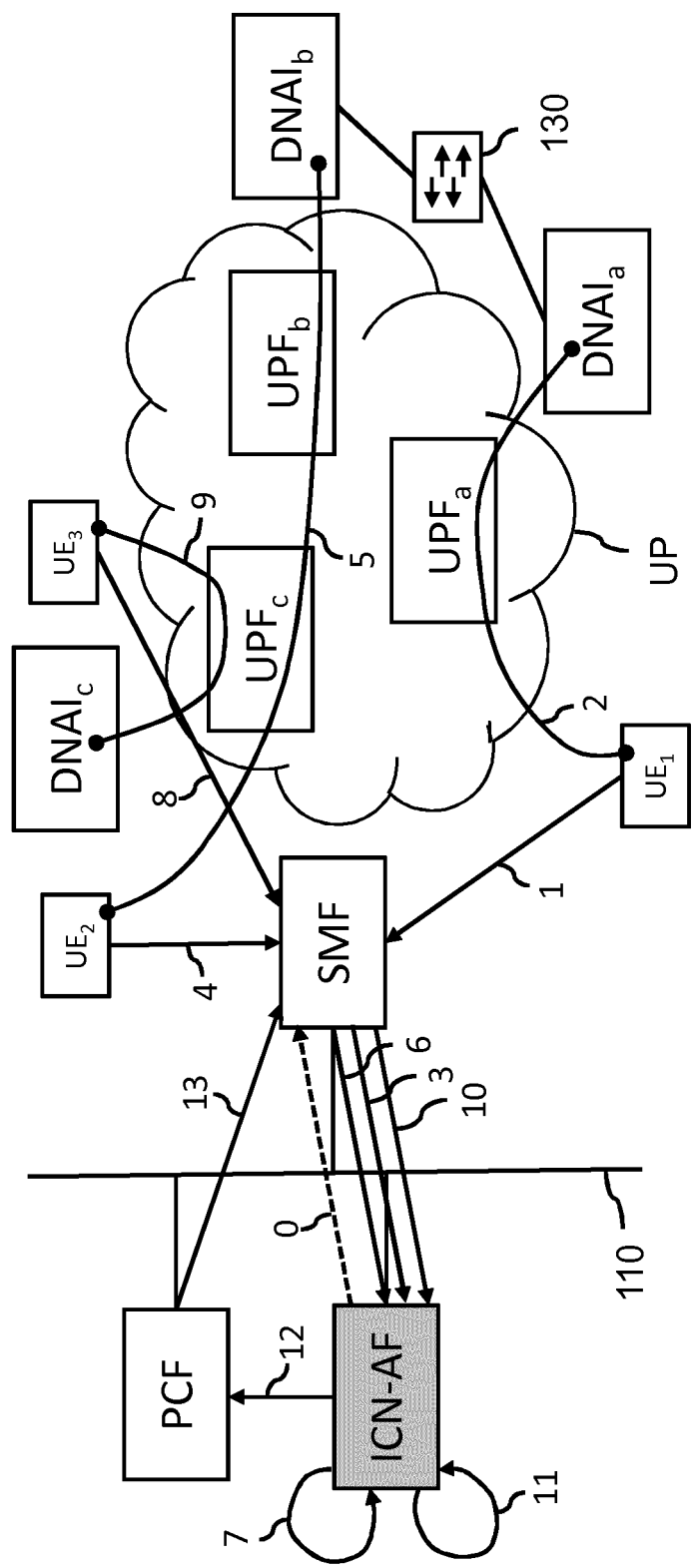
FIG. 6 illustrates the orchestration of ICN traffic by the ICN-AF.
Figure 7A:
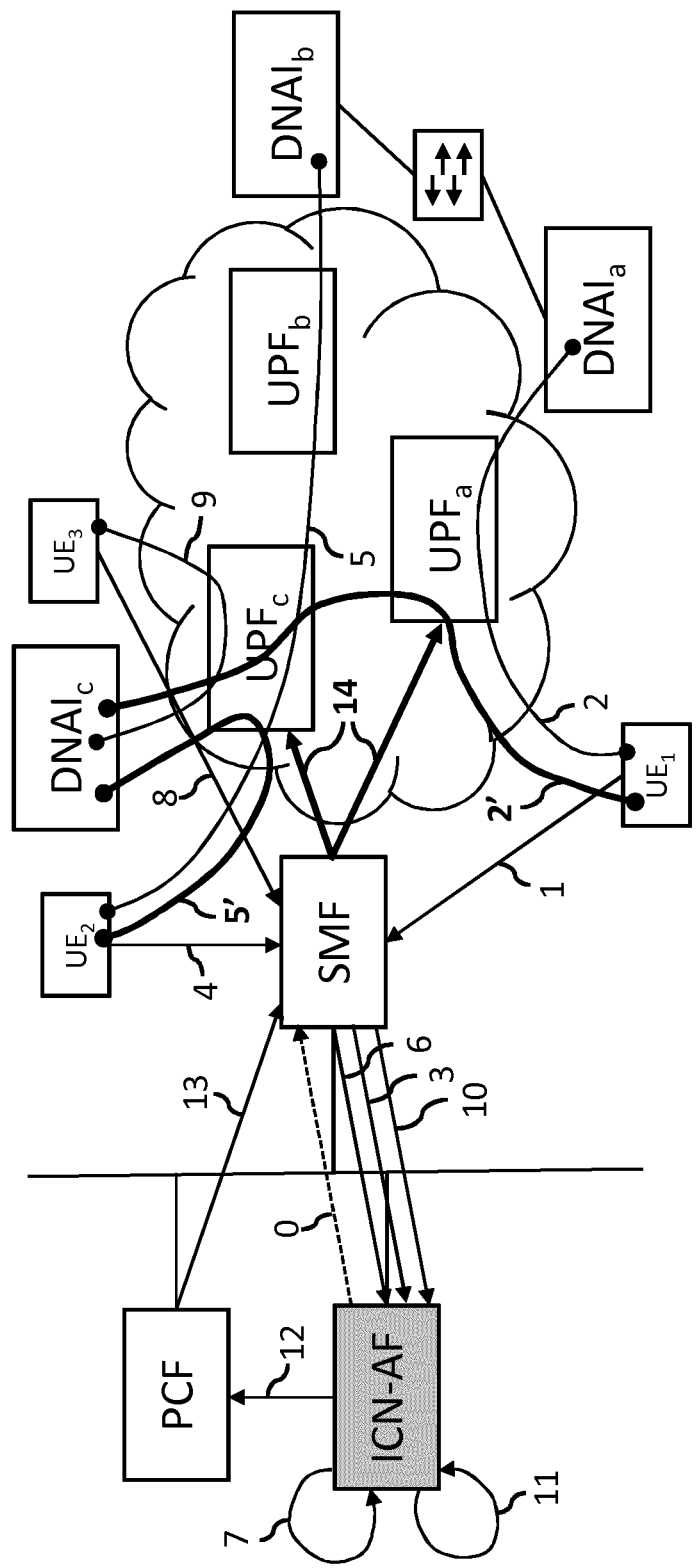
FIG. 7A shows the ICN-AF moving PDU sessions for an example in which UE3 has a relatively large amount of published content.
Figure 7B:
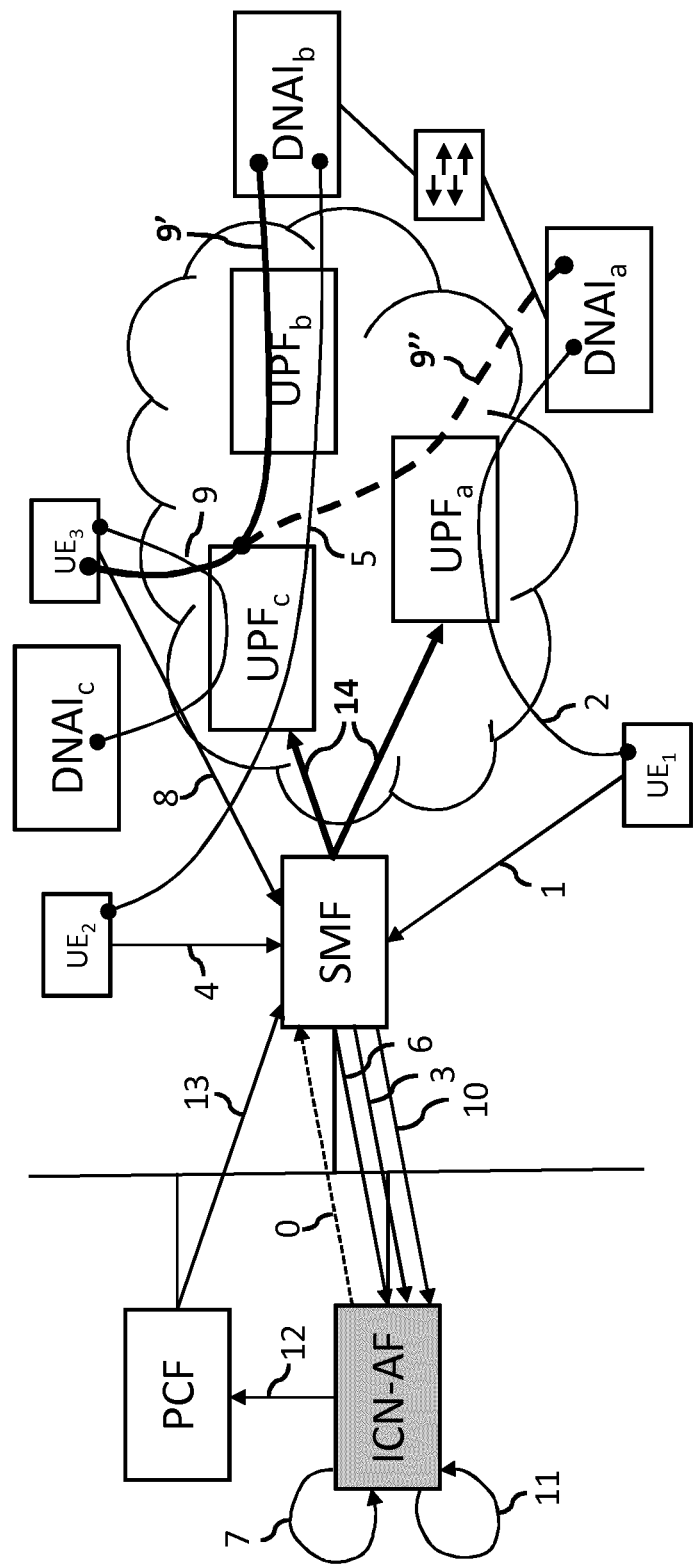
FIG. 7B shows the ICN-AF moving PDU sessions for an example in which UE3 has a relatively small amount of published content.

FIGS. 6-7B illustrate the control of ICN protocol-based traffic flow by the ICN-AF when an ICN-UE requests to establish a PDU session. A first part of the message exchange may be as follows (the numbering matching FIG. 6):

0. The ICN-AF may have all ICN-UE identities pre-configured and may subscribe to the SMF for any PDU session change related to the ICN-UE identities, e.g., using the service operation Nsmf_EventExposure_Subscribe (UE ID, "DNAI changed" Event ID, ICN-AF ID) specified in 3GPP TS 23.502, clause 5.2.8.3.3.

Note that in general, instead of the Event ID DNAI change, any type of information indicative of PDU session establishment to a DNAI may be used.

1. UE1 may send a PDU session Establishment Request to the SMF.

2. The PDU session to the UE may established, for example according to the procedure specified in TS 23.502, clause 4.3.2.2.1, either to a default DNAI or a DNAI is chosen based on the UE's location. In this case it is DNAIa.

3. The ICN-AF may be notified by the SMF that a PDU session is created for UE1, for example with the service operation Nsmf_EventExposure_Notify (UE1 ID, PDU Session ID, DNAIa) specified in TS 23.502 clause 5.2.8.3.2.

4-6. A PDU session for UE2 may be established and the ICN-AF may be notified (UE2 ID, PDU Session ID, DNAIb) in the same way as for UE1.

7. The ICN-AF may evaluate the published content in UE1 and UE2 as well as the connectivity between DNAIa and DNAIb, with the latter involving an external switch 130, and may determine that there is no need to influence the traffic routing.

8-10. A PDU session for UE3 may be established and the ICN-AF may be notified (UE3 ID, PDU Session ID, DNAIc) in a same way as for UE1 and UE2.

11. The ICN-AF may evaluate the published content by all three UEs (and possible networks behind them) and the connectivity between DNAIa, b and c.

Since DNAIc has no connectivity to DNAIa and b, the ICN-AF may decide to establish such connectivity. Depending on the published content by UE3 and the ICN network behind it, the ICN-AF may influence traffic routing by sending a request or multiple requests to the PCF regarding each PDU session (see also step 12 below). In case UE3 has a significant amount of published content and UE1 and UE2 have less published content, the PDU sessions of UE1 and UE2 may be moved to DNAIc. However, if that is not the case, then only the PDU session of UE3 may be moved either to DNAIb or DNAIa, depending on UE3's location. An objective of the ICN-AF may be to move the (presumed) requesters towards the publishers, not the other way around. With further reference to FIG. 6, the message exchange may further comprise:

12. The ICN-AF may request from the PCF to influence traffic routing by using the service operation Npcf_PolicyAuthorization_Create/Update (UE ID, DNAI). This request may also go via the NEF (not depicted in FIG. 6 for brevity).

13. The PCF may send a policy update to the SMF by using the service operation Npcf_SMPolicyControl_UpdateNotify (UE ID, PDU Session ID, DNAI) to inform the SMF that the anchor UPF is to be changed to the requested DNAI.

14. The SMF may change the anchor UPF to one that has connectivity to the requested DNAI.

The latter step is shown in FIGS. 7A, 7B, which each show a different outcome of step 14 depending on whether UE3 has a significant amount of published content compared to UE1 and UE2 or not. FIG. 7A shows the former case, showing the PDU sessions of UE1 and UE2 (2' and 5' in FIG. 7A) having been moved to DNAIc. FIG. 7B shows the latter case, showing the PDU session of UE3 having been moved to DNAIb (9' in FIG. 7B) or alternatively to DNAIa (dotted line, 9" in FIG. 7B). It is noted that the procedure of steps 12-14 is specified in 3GPP TS 23.502 clause 4.3.6.

Various alternatives to the above-described manner of reassigning a DNAI of a PDU session of a presumed requester are within reach of the skilled person based on the present disclosure. The assigning of a DNAI in the establishment of a PDU session of a presumed requester is equally within reach of the skilled person based on the present disclosure.

Figure 8:
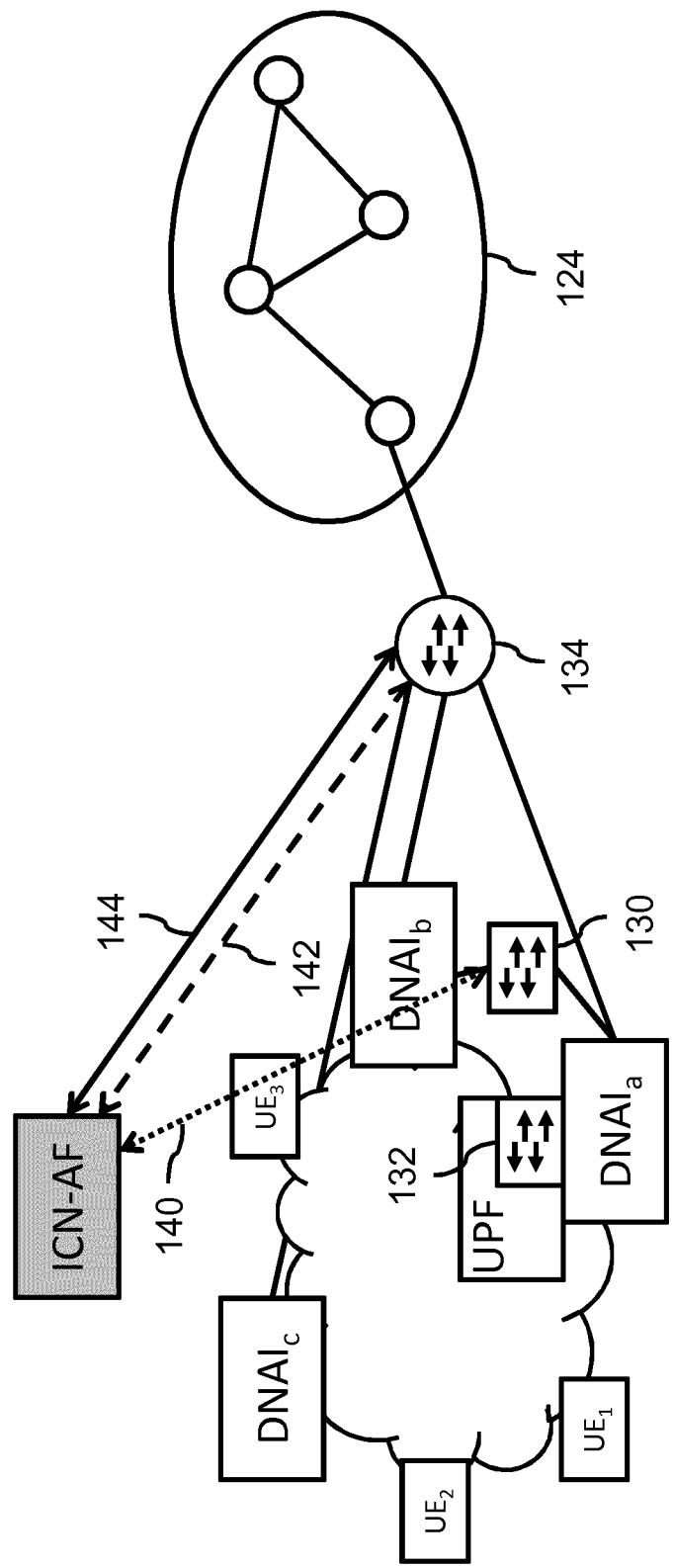
FIG. 8 illustrates different user plane switching options and the interfaces of the respective switches to the ICN-AF.

FIG. 8 shows different options for user plane switching which may be used to effect the movement of PDU sessions. The entities involved in the switching are also simply referred to as 'switches' or 'switching functions'. For example, such a switch may be provided as integral part 132 of the UPF, as an external switch 130 between DNAIs, or as an external switch 134 to an ICN island 124. A distinct difference between these switching functions are their interfaces to the ICN-AF which are shown as (dashed) lines in FIG. 8 and which are further explained in the following.

It is noted that Ethernet PDU sessions may be convenient because multiple QoS flows may be provided in the 5G network and because the UPFs have switching functionality. Namely, the UPFs may be considered regular ethernet switches (as indicated in FIG. 8 by the switch 132 being shown as an integral part of the UPF), with each PDU session being a link. Since ICN protocol-based traffic may already be defined to flow over Ethernet, no special handling may be necessary. Furthermore, this Ethernet-type of switching may also be performed outside of the 3GPP network, even between DNAIs, when using external switches such as switches 130, 134. This may be especially useful in situations where the 3GPP network operator and the ICN network operator have or may have different levels of technical relations. If the switching is performed outside of the 3GPP network, e.g., using the aforementioned external switches 130, 134, the ICN-AF may be aware of such a switching function either by configuration or standard dynamic switch-controller association establishment, for example via an interface 140 from the external switch 130 to the ICN-AF.

A switching function may also be aware of ICN layer traffic and have an interface to the ICN-AF over which ICN layer information, such as Interest and Data message statistics, topology messages, etc., may be exchanged. In this case, the switching function may act as 1) a data collection point and provide information to the ICN-AF, or 2) become involved in the control plane of the network by acting as an ICN-UE and having an ICN network ('ICN island') behind it. These two options are shown schematically in FIG. 8 by way of the external switch 134 having two different interfaces to the ICN-AF (dashed line 142 for the interface of option 1, solid line 144 for the interface of option 2). An advantage of the first option may be that the ICN-AF may obtain more information on network status upon which to base its control of ICN protocol-based traffic flow. An advantage of the second option may be that ICN islands may also be connected from the DNN side instead of only the UE side.

Instead of Ethernet PDU sessions, Unstructured PDU sessions may also be used. To enable their use, a routing entity may need to be provided outside of the 3GPP network, as well as an ICN router behind the UPF. Furthermore, an adaptation of the ICN layer in the UE to the point-to-point PDU session may be needed, for example in the form of ICN over PPPoE or another point-to-point like tunnel.

The ICN packets may also be carried in UDP or TCP/IP over the PDU session layer, at the expense of additional overhead. Using this encapsulation might be beneficial when directly connecting to an existing UDP or TCP/IP overlaid ICN network.

ICN-AF to ICN Router Interface

There may be several levels of interworking between the ICN-AF and the switching functions, including those acting as ICN-router (see below). For example, if there exists an association between the ICN-AF and a particular ethernet switch, e.g., by means of the aforementioned standard dynamic switch-controller association establishment, only the DNAI connections may need to be sent to the ICN-AF so that the ICN-AF may take these into account when (re)organizing the PDU sessions.

If a switching function is ICN traffic aware and reports ICN-related information such as the number of Interests and Data messages between endpoints, the switching function may be considered to represent an ICN router. The reported information may take the form of tuples (Source, Destination, Number of Interest Packets, Number of Data Packets) or simply the number of Interest or Data packets per Source or Destination. The ICN-AF may use this information either as a supplement to the published content information received from UEs, or in some embodiments reorganize the PDU sessions in the network solely based on Interest/Data statistics instead of the published content. The Source and Destination identifiers may be associated with UE PDU sessions in the 5G network. If the ICN router function is performed by the UPF, this may be fairly straightforward case since the UPF already has a context for each specific UE containing tunnel IDs. However, if this is not the case, the ICN-AF may need to correlate the PDU sessions to the statistics in the ICN router. If the PDU sessions are of type Ethernet or IP, the MAC or IP address may be used as it designates the UE side of the PDU session. However, in case of Unstructured PDU session type there may a tunnel between the UPF and the ICN router for each PDU session as specified in TS 23.501. Each of these tunnels may represent a different Face ID to the ICN router and may be reported to the ICN-AF during each tunnel establishment to enable the ICN-AF to perform the above correlation to bind the Interest and Data information to a specific Face ID.

Whenever there is an ICN network behind the ICN Router, the ICN-AF to ICN router interface may also include the functionality of an ICN-UE to ICN-AF interface. This may enable the ICN router to report the published content in that network, which in turn may further influence the ICN-AF's orchestration of ICN traffic, even though the ICN network is not bound to a PDU session and cannot be moved.

Whenever a PDU session has a corresponding entity in the ICN Router, for example a Tunnel ID (in case the ICN router function is implemented by the UPF) or a Face ID (in case of Unstructured PDU session type), throughput statistics may also be provided to the ICN-AF. Based on these throughput statistics, the ICN-AF may for example reorganize the network or request the UEs to establish a second PDU.

General

In some embodiments, the ICN-AF may partly reside in the control plane and partly in the user plane of the communication network. For that purpose, the ICN-AF may be partitioned in an application function control plane part operating in the control plane and an application function user plane part operating in the user plane. The latter may be embodied by a switching function or an ICN router.

In some embodiments, the communication network may be configured to enable instantiation of different network slices. In such embodiments, ICN traffic may flow via a dedicated network slice, isolating it from other traffic handled by the network.

Data Processing Entities

Figure 9:
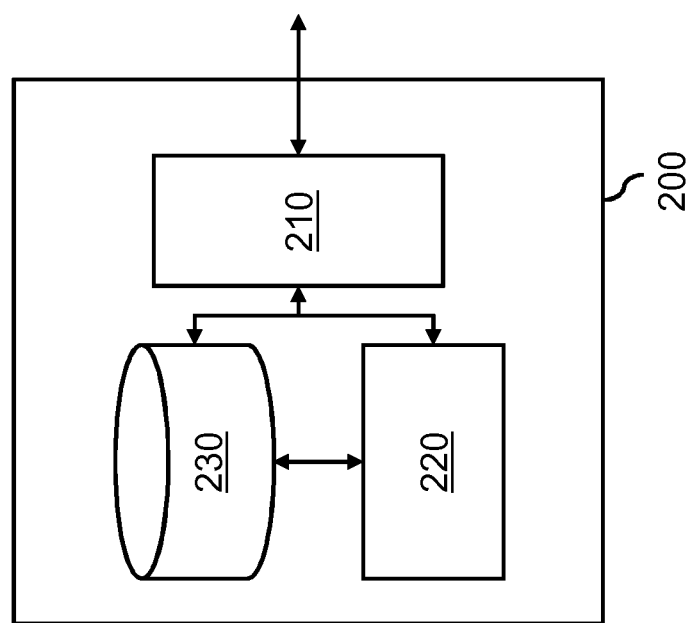
FIG. 9 shows a system which may represent a network node implementing the ICN-AF, or an ICN router, or an ICN-UE communicating with the ICN-AF.

FIG. 9 shows a system 200 which may represent a device or network node implementing an ICN-AF, or an ICN router, or an ICN-UE configured for communicating with the ICN-AF. FIG. 9 shows the system 200 to comprise a network interface 210 for communicating with (other) network nodes in the network. The network interface 210 may take any suitable form, including but not limited to a wired network interface based on Ethernet or optical fiber or a wireless network interface. FIG. 9 further shows the system 200 comprising a storage 230, such as a hard disk, a solid-state drive, or an array thereof, which may be used by the system 200 for storing data.

The system 200 may further comprise a processor 220 which may be configured, e.g., by hardware design or software, to perform the operations described with reference to FIG. 2-8 in as far as pertaining to an ICN-AF, an ICN router or an ICN-UE. For example, the processor 220 may be embodied by a single Central Processing Unit (CPU), but also by a combination or system of such CPUs and/or other types of processing units. In general, the system 200 may be embodied by a (single) device or apparatus but also by a distributed system of such devices or apparatuses.

The aforementioned device or apparatus may comprise one or more (micro)processors which execute appropriate software. Software implementing the functionality of the function(s) may have been downloaded and/or stored in a corresponding memory or memories, e.g., in volatile memory such as RAM or in non-volatile memory such as Flash. Alternatively, the function(s) may be implemented in the device or apparatus in the form of programmable logic, e.g., as a Field-Programmable Gate Array (FPGA). In general, each function may be implemented as a circuit.

It is noted that any of the methods described in this specification, for example in any of the claims, may be implemented on a computer as a computer implemented method, as dedicated hardware, or as a combination of both.

Figure 10:
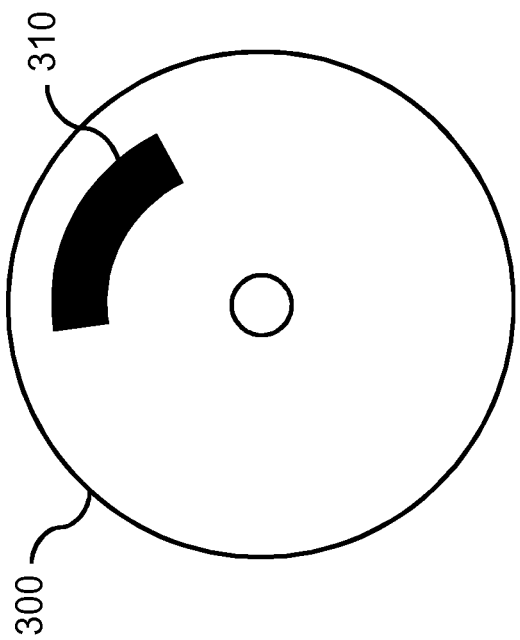
FIG. 10 shows a computer readable medium comprising non-transitory data comprising instructions for causing a processor system to perform the method.

Instructions for the computer, e.g., executable code, may be stored on a computer readable medium 300 as for example shown in FIG. 10, e.g., in the form of a series 310 of machine readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 10 shows by way of example an optical storage device 300.

Figure 11:
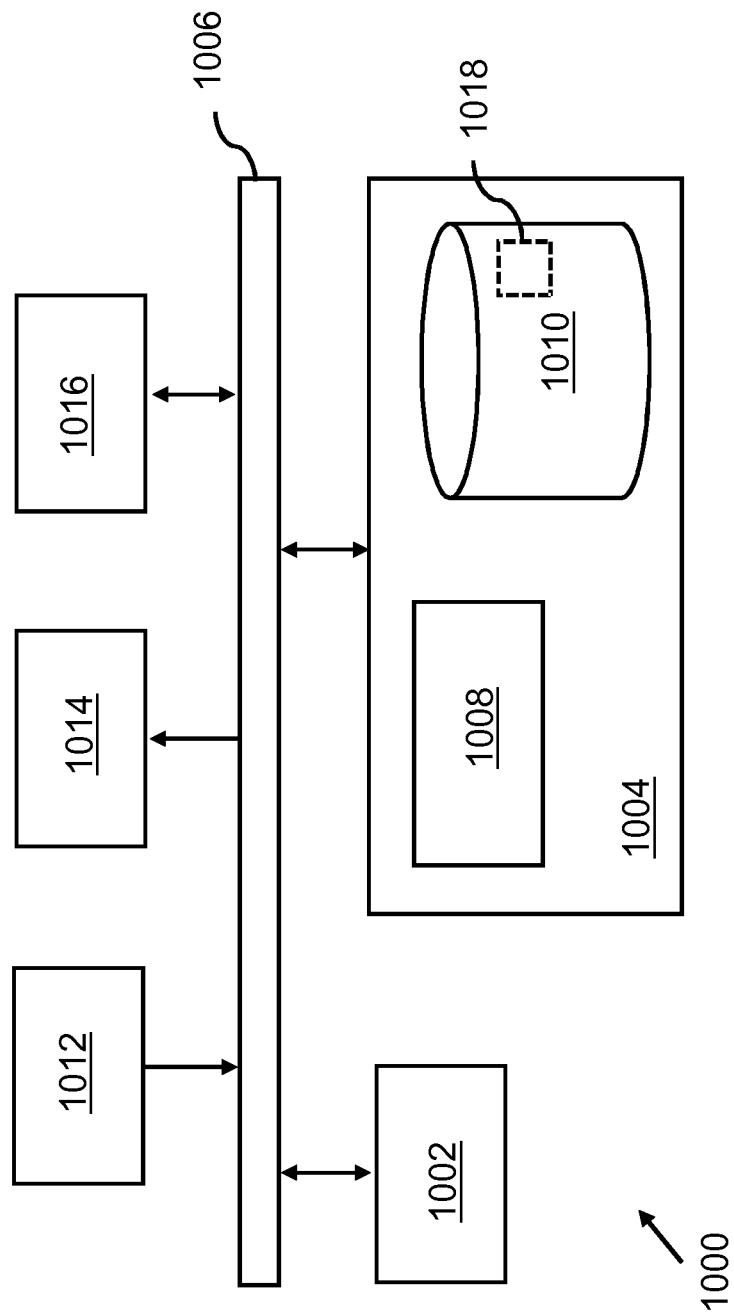
FIG. 11 shows an exemplary data processing system.

FIG. 11 is a block diagram illustrating an exemplary data processing system that may be used in the embodiments described in this specification. Such data processing systems include data processing entities described in this specification, including but not limited to data processing entities implementing functions such as but not limited to an ICN-AF, an ICN router, an ICN-UE, etc.

The data processing system 1000 may include at least one processor 1002 coupled to memory elements 1004 through a system bus 1006. As such, the data processing system may store program code within memory elements 1004. Further, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

Memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The processing system 1000 may also include one or more cache memories (not shown) that provide temporary storage of at least some program code in order to reduce the number of times program code must be retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 11, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

In one aspect, for example, data processing system 1000 may implement an ICN-AF. In that case, application 1018 may represent an application that, when executed, configures data processing system 1000 to perform the functions described herein with reference to an ICN-AF. In another aspect, data processing system 1000 may implement an ICN router. In that case, application 1018 may represent an application that, when executed, configures data processing system 1000 to perform the functions described herein with reference to an ICN router. In another aspect, data processing system 1000 may implement an ICN-UE. In that case, application 1018 may represent an application that, when executed, configures data processing system 1000 to perform the functions described herein with reference to an ICN-UE.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A network node or a distributed system of network nodes configured as an information-centric networking application function (ICN-AF) for use with a communication network, wherein the communication network comprises a plurality of network nodes and is configured to provide:

a control plane to enable transmission of control data in the communication network;

a user plane to enable transmission of data to or from user equipment which is connected to the communication network; and a set of network functions which comprise control plane functions operating in the control plane, wherein the control plane functions include the information-centric networking application function (ICN-AF) for controlling ICN protocol-based traffic flow between a set of user equipment (UE), wherein each user equipment (UE) of the set of user equipment represents an ICN node in an ICN network and is configured for exchange of content via ICN protocol-based traffic, wherein the ICN protocol-based traffic is at least in part transported via protocol data unit (PDU) sessions in the communication network;

wherein the network node or the distributed system of network nodes comprises:
  a network interface to the communication network;
  a processor system configured to:
    for at least one of the ICN nodes, obtain information indicative of whether, and optionally to which degree, a respective ICN node is publisher of content in the exchange of content between the ICN nodes;
    initiate a reassignment of a protocol data unit (PDU) session of an ICN node which is not characterized as publisher of content to a data network access point which has connectivity to, or which is the same as, a data network access point assigned to an ICN node which is characterized as publisher of content;
  wherein the ICN application function (ICN-AF) is configured to limit or avoid initiating the reassignment of a data network access point for an ICN node which is characterized as publisher of content.

2. The network node or distributed system of network nodes according to claim 1, wherein the control plane functions further comprise a session management function (SMF) for session management of the protocol data unit (PDU) sessions involving the user equipment, and wherein the ICN application function (ICN-AF) is configured to initiate the reassignment of the PDU session by requesting the session management function (SMF) to effect the reassignment.

3. The network node or distributed system of network nodes according to claim 1, wherein the ICN application function (ICN-AF) is configured to, in the establishment of a protocol data unit (PDU) session for an ICN node which is not characterized as publisher of content, initiate an assignment of said protocol data unit (PDU) session to a data network access point which has connectivity to, or which is the same as, a data network access point assigned to an ICN node which is characterized as publisher of content.

4. The network node or distributed system of network nodes according to claim 1, wherein said reassignment comprises providing a data network access identifier identifying a reassigned data network access point to a respective ICN node.

5. The network node or distributed system of network nodes according to claim 1, wherein the information obtained by the ICN application function (ICN-AF) is indicative of at least one of:
  a number of content objects, and
  a data size of all or individual ones of the content objects, which are published by the respective ICN node.

6. The network node or distributed system of network nodes according to claim 1, wherein the ICN application function (ICN-AF) is configured to receive the information pertaining to a respective ICN node from the respective ICN node.

7. The network node or distributed system of network nodes according to claim 6, wherein the ICN application function (ICN-AF) is configured to receive the information pertaining to a respective ICN node from the respective ICN node via:
  a non-access stratum (NAS) transport mechanism; or
  via a protocol data unit (PDU) session of the respective ICN node.

8. The network node or distributed system of network nodes according to claim 2, wherein the control plane functions further comprise a network exposure function (NEF), and wherein the ICN application function (ICN-AF) is configured to communicate with the session management function (SMF) and/or other control plane functions via the network exposure function.

9. The network node or distributed system of network nodes according to claim 2, wherein the control plane functions further comprise a policy control function (PCF) for policy control of quality of service in the communication network, wherein the session management function (SMF) is configured to perform the session management based on policy data provided by the policy control function, and wherein the ICN application function (ICN-AF) is configured to control the session management of protocol data unit (PDU) sessions via the policy control function (PCF).

10. The network node or distributed system of network nodes according to claim 1, wherein the ICN application function (ICN-AF) is configured to, when there are multiple data network access points that have connectivity to the data network access point of the ICN node characterized as publisher, initiate the reassignment of the PDU session of the ICN node which is not characterized as publisher of content to the data network access point which is nearest in terms of a distance in the network topology to the data network access point of the ICN node characterized as publisher.

11. The network node or distributed system of network nodes according to claim 1, wherein the ICN application function (ICN-AF) is configured to receive:
  second information which identifies content items which are published by a respective ICN node, or the network behind said ICN node, for example by the information providing the names or name prefixes of published content items; and
  third information which identifies content items which are requested by a respective ICN node, or the network behind the respective ICN node;
  wherein the ICN application function (ICN-AF) is further configured to initiate the reassignment of the protocol data unit (PDU) session of an ICN node which is based on the third information characterized as requester of a content item to a data network access point which has connectivity to, or which is the same as, a data network access point assigned to an ICN node which is based on the second information characterized as publisher of the content item.

12. An information-centric networking application function (ICN-AF) for use with a communication network, wherein the communication network comprises a plurality of network nodes and is configured to provide:
  a control plane to enable transmission of control data in the communication network;
  a user plane to enable transmission of data to or from user equipment which is connected to the communication network; and
  a set of network functions which comprise control plane functions operating in the control plane, wherein the control plane functions include the information-centric networking application function (ICN-AF) for controlling ICN protocol-based traffic flow between a set of user equipment (UE),
  wherein each user equipment (UE) of the set of user equipment represents an ICN node in an ICN network and is configured for exchange of content via ICN protocol-based traffic, wherein the ICN protocol-based traffic is at least in part transported via protocol data unit (PDU) sessions in the communication network;

wherein the ICN application function (ICN-AF) is configured to:
for at least one of the ICN nodes, obtain information indicative of whether, and optionally to which degree, a respective ICN node is publisher of content in the exchange of content between the ICN nodes;
initiate a reassignment of a protocol data unit (PDU) session of an ICN node which is not characterized as publisher of content to a data network access point which has connectivity to, or which is the same as, a data network access point assigned to an ICN node which is characterized as publisher of content;
wherein the ICN application function (ICN-AF) is configured to limit or avoid initiating the reassignment of a data network access point for an ICN node which is characterized as publisher of content.

13. A communication network which comprises a plurality of network nodes and is configured to provide:
a control plane to enable transmission of control data in the communication network;
a user plane to enable transmission of data to or from user equipment which is connected to the communication network; and
a set of network functions which comprise control plane functions operating in the control plane, wherein the control plane functions include an information-centric networking application function (ICN-AF) for controlling ICN protocol-based traffic flow between a set of user equipment (UE),
wherein each user equipment (UE) of the set of user equipment represents an ICN node in an ICN network and is configured for exchange of content via ICN protocol-based traffic, wherein the ICN protocol-based traffic is at least in part transported via the protocol data unit (PDU) sessions in the communication network;
wherein the ICN application function (ICN-AF) is configured to:
for at least one of the ICN nodes, obtain information indicative of whether, and optionally to which degree, a respective ICN node is publisher of content in the exchange of content between the ICN nodes;
initiate a reassignment of a protocol data unit (PDU) session of an ICN node which is not characterized as publisher of content to a data network access point which has connectivity to, or which is the same as, a data network access point assigned to an ICN node which is characterized as publisher of content;
wherein the ICN application function (ICN-AF) is configured to limit or avoid initiating the reassignment of a data network access point for an ICN node which is characterized as publisher of content.

14. The communication network according to claim 13, wherein the information obtained by the ICN application function (ICN-AF) is indicative of at least one of:
a number of content objects, and
a data size of all or individual ones of the content objects, which are published by the user equipment as the ICN node.

15. A method for use with a communication network which comprises a plurality of network nodes and is configured to provide:
a control plane to enable transmission of control data in the communication network;
a user plane to enable transmission of data to or from user equipment which is connected to the communication network; and
a set of network functions which comprise control plane functions operating in the control plane;
the method comprising:
controlling ICN protocol-based traffic flow between a set of user equipment (UE), wherein each user equipment (UE) of the set of user equipment represents an ICN node in an ICN network and is configured for exchange of content via ICN protocol-based traffic, wherein the ICN protocol-based traffic is at least in part transported via protocol data unit (PDU) sessions in the communication network;
wherein the controlling of ICN protocol-based traffic flow comprises:
for at least one of the ICN nodes, obtaining information indicative of whether, and optionally to which degree, a respective ICN node is publisher of content in the exchange of content between the ICN nodes;
initiating reassigning a protocol data unit (PDU) session of an ICN node which is not characterized as publisher of content to a data network access point which has connectivity to, or which is the same as, a data network access point assigned to an ICN node which is characterized as publisher of content;
limiting or avoiding initiating the reassignment of a data network access point for an ICN node which is characterized as publisher of content.

16. A non-transitory computer-readable medium comprising a computer program, the computer program comprising instructions for causing a processor system to perform the method according to claim 15.

* * * * *